Figures 1, 2, 3:
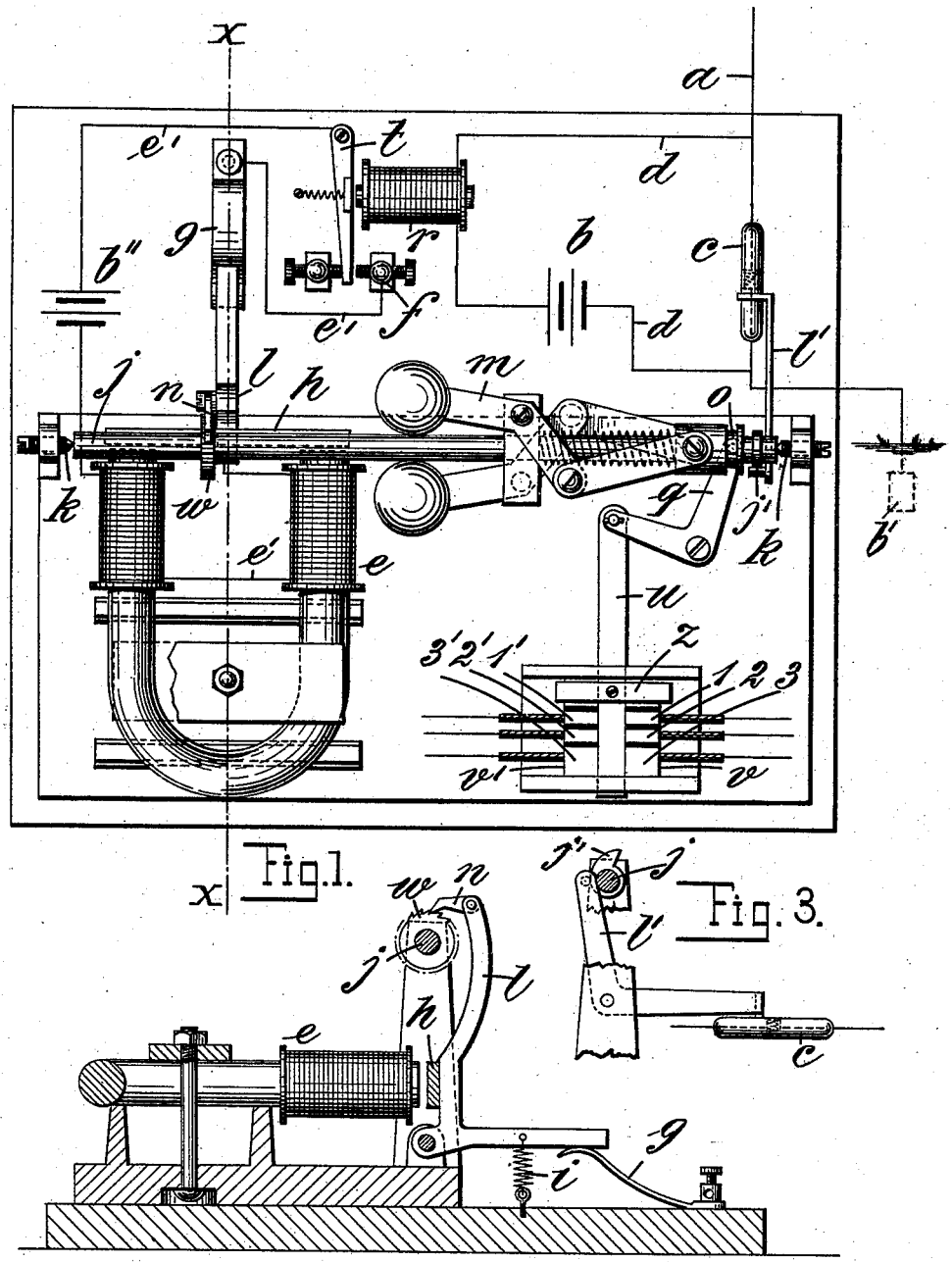

No. 693,597. Patented Feb. 18, 1902.
J. GARDNER.
APPARATUS FOR CONTROLLING ACTIONS AT A DISTANCE.
(Application filed Dec. 30, 1901.)
(No Model.) 3 Sheets—Sheet 1.

WITNESSES
INVENTOR

No. 693,597. Patented Feb. 18, 1902.
J. GARDNER.
APPARATUS FOR CONTROLLING ACTIONS AT A DISTANCE.
(Application filed Dec. 30, 1901.)

(No Model.) 3 Sheets—Sheet 2.

WITNESSES
M. H. Watkins
I. A. Macdonald

INVENTOR
John Gardner,
By Geo. Whitney
Atty

No. 693,597. Patented Feb. 18, 1902.
J. GARDNER.
APPARATUS FOR CONTROLLING ACTIONS AT A DISTANCE.
(Application filed Dec. 30, 1901.)
(No Model.) 3 Sheets—Sheet 3.

WITNESSES
M. H. Watkins
L. Macdonald

INVENTOR
John Gardner

UNITED STATES PATENT OFFICE.

JOHN GARDNER, OF FLEETWOOD, ENGLAND.

APPARATUS FOR CONTROLLING ACTIONS AT A DISTANCE.

SPECIFICATION forming part of Letters Patent No. 693,597, dated February 18, 1902.

Application filed December 30, 1901. Serial No. 87,781. (No model.)

*To all whom it may concern:*

Be it known that I, JOHN GARDNER, a subject of the King of Great Britain, residing at Knott End, Fleetwood, in the county of Lancaster, England, have invented new and useful Improvements in Apparatus for Controlling Actions at a Distance, of which the following is a specification.

It is known that certain simple actions, of which the steering of a torpedo and the operation of a telegraphic instrument are examples, can be controlled from a distance by the aid of etheric undulations, such as "Hertzian waves."

The object of my invention is to control separately or simultaneously a plurality of actions at a distance through the agency of etheric undulations. For example, I may have a torpedo or submarine vessel without a crew in a state of rest and from the distant transmitting and controlling station may start and stop it at will, steer it in any desired direction, and explode a contained charge or compel it to return to its own or any station if not exploded. Similarly, distant signal-stations, automobiles, dirigible balloons, light-stations, and the like may be controlled.

At the transmitting-station I have an installation comprising the usual apparatus employed in ordinary "wireless telegraphy" and including a Morse key or a mechanical device whereby I can periodically close the transmitting-circuit (a) by closures of constantly uniform length with greater or with less intervals between them or (b) by closures of greater or of less length with uniformly equal intervals between them in all cases. In other words, I arrange that for each action or operation at a distance there shall be a different sum of the periods of transmission in unit time. In the receptor, which may be a torpedo-boat, signaling or lighting station, or the like, I arrange a receiving-circuit comprising a receiving-wire, coherer, relay and battery, a decoherer, if required, an electrically-controlled motor, a centrifugal governor driven by the motor, a plurality of local electric circuits with terminals normally open, and a circuit-closer operated by the muff of the governor. The motor-circuit is opened and closed by the relay in the receiving-circuit, so that the work done in the motor is exactly proportionate to the transmission at the distant controlling-station, and it follows that the speed of the centrifugal governor, and consequently the position of the circuit-closer, can thus be exactly determined to close one or other of the local circuits, as may be desired.

I will more particularly describe my said invention with reference to the accompanying drawings, in which—

Figure 4:
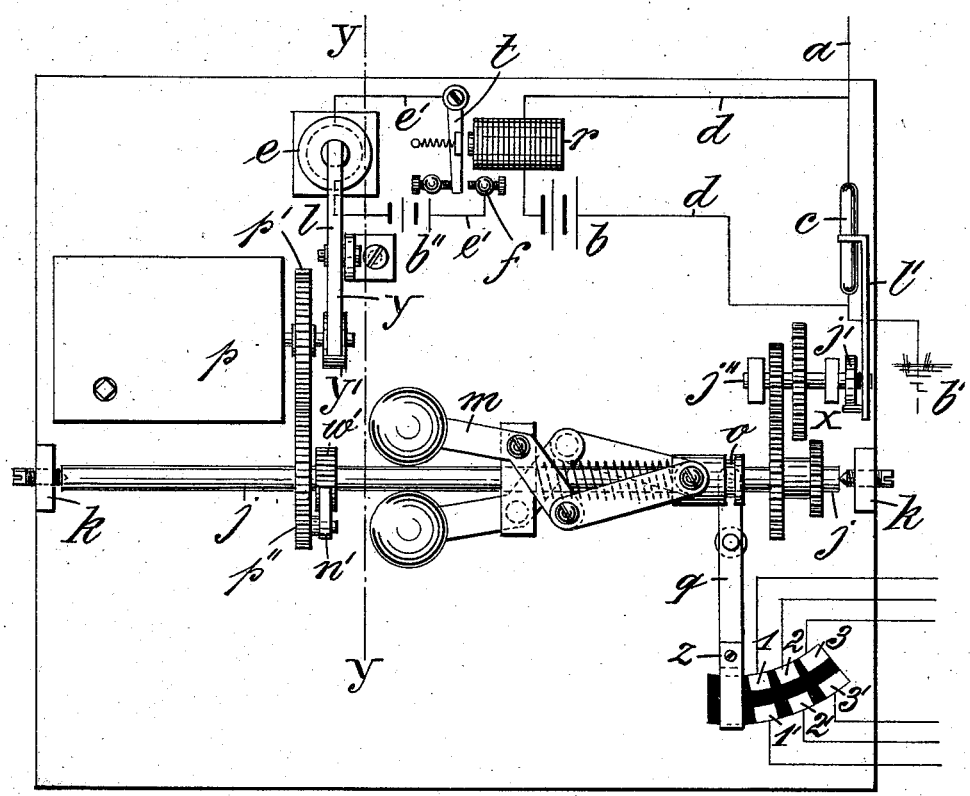
Figure 5:
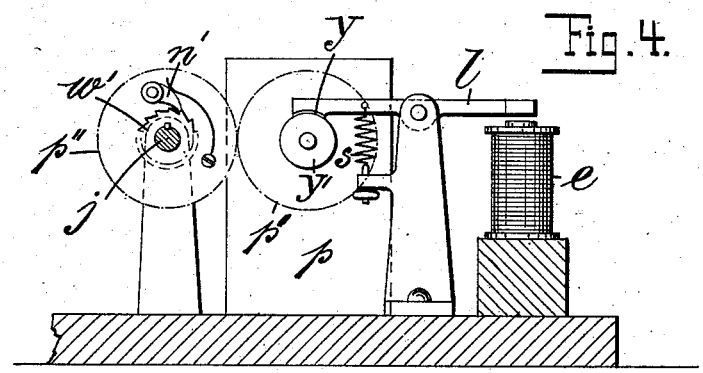
Figure 11:
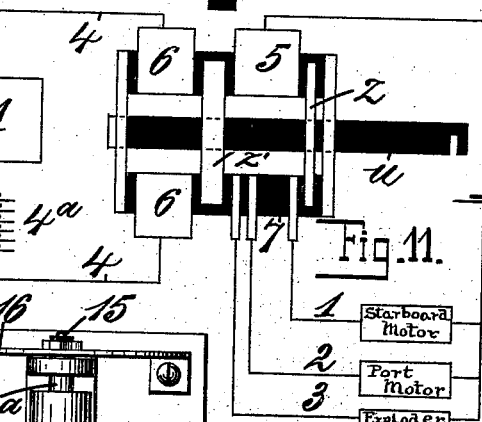
Figures 12, 13:
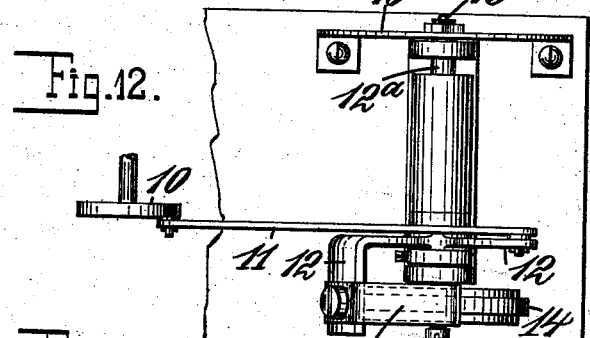

Figure 1 represents a plan view, and Fig. 2 a transverse section along the line $x\,x$, Fig. 1, of the apparatus contained in the receptor. Fig. 3 is a sectional elevation of the decoherer shown in Fig. 1. Fig. 4 shows in plan view a mere modification of the construction illustrated by Fig. 1, and Fig. 5 shows a transverse section along the line $y\,y$, Fig. 4. Figs. 6, 7, 8, 9, and 10 are diagrams illustrating successive positions of the circuit-closer shown in Fig. 1. Fig. 11 is a diagram showing a different arrangement of the local circuits and circuit-closer. Figs. 12 and 13 show, respectively, a plan view and elevation of the transmitting device which I may employ; and Fig. 14, cross-sections of the transmitting device in two positions, drawn to a larger scale.

The receptor apparatus, which I have illustrated by Figs. 1 and 2, has been designed for the control of three local circuits only; but when required there may be a greater or less number than three. In a twin-screw torpedo, for example, the local circuits may control or include, first, the port motor; second, the starboard motor, and, third, the exploder or fuse.

In each of the figures where the parts are represented, $a$ is the aerial or receiving wire, $b'$ a battery, $b'$ an earth connection, $r$ a telegraphic relay, and $c$ a coherer, all in or connected with the receiving-circuit $d$. The motor-control circuit $e'$ includes the battery $b''$, the relay-tongue $t$, the contact-terminal $f$, the spring $g$, Fig. 1, and the lever $l$, Fig. 1. This lever carries opposite to the magnet-poles an armature $h$, so that this armature, together with the lever, is attracted toward the magnet each time that the circuit is closed by the relay. This movement of the lever lifts its tailpiece from contact with the flat spring $g$ and opens the motor-circuit. The armature being no longer attracted is pulled back by the spring $i$, and these movements are successively repeated so long as transmission continues.

A spindle $j$, carried in the pivots $k\ k$, has mounted upon it the centrifugal governor $m$ and a ratchet-wheel $w$. The upper end of the lever $l$ has pivoted to it the pawl $n$, engaging with the teeth of the ratchet-wheel $w$. The vibratory motion of the lever thus produces rotary motion in the centrifugal governor. The muff $o$ of the centrifugal governor is connected through the cranked lever $q$ with the sliding bar $u$, which carries the circuit-closer $z$. On opposite sides of the bar $u$ are arranged terminal plates $1\ 1'$, $2\ 2'$, and $3\ 3'$ of the local circuits 1 2 3, which terminals may be bridged or connected by the circuit-closer $z$ successively or otherwise.

It is known that in apparatus for receiving etheric undulations in which a coherer is employed a decoherer is not required in some cases where great sensitiveness is not necessary; but if and when a decohering apparatus is desirable it may be of the ordinary construction, as now employed in wireless telegraphy; but I find that the decoherences may be less frequent. For this reason I may employ the means illustrated by Figs. 1 and 3 or the means hereinafter described with reference to Fig. 4. As illustrated by Fig. 1, I fix upon the end of the shaft $j$ a tappet $j'$, which vibrates the bent lever $l'$ and insures the tapping of the coherer in proportion to the speed of the governor. The coherer should in any case be isolated from any other source of percussive motion by being bedded in felt or otherwise.

The motor illustrated by Figs. 1 and 2 may be equally well substituted in cases where it can be wound up from time to time by the mechanical or clockwork motor illustrated by Figs. 4 and 5. The terminal plates of the local circuits also may be differently arranged, as indicated by Fig. 4. The speed of the clockwork-motor $p$, which drives the governor only, is controlled by the brake $y$, acting on a brake-pulley $y'$. The spindle $j$ may form an extension of the motor-spindle or be parallel with it and be driven thereby through the wheels $p'\ p''$. The wheel $p''$ is loose on the governor-shaft and carries a pawl $n'$, engaging with a ratchet-wheel $w'$ on the spindle $j$. The governor will thus continue its rotation after the brake has been put on. An electromagnet $e$ is in a circuit including a battery $b''$ and the relay-tongue $t$. Normally the brake is held "on" by the spring $s$, and it will be lifted by the attraction of the electromagnet $e$ at the opposite end of the brake-lever $l$ as often as the movement of the relay-tongue closes the magnet-circuit. It follows that the result is precisely the same as when the motor shown by Figs. 1 and 2 is used—that is to say, the governor will run at a higher speed with a greater frequency of transmission or with a greater duration of transmission in unit time, and the reverse. The circuit-closer $z$ (shown by Fig. 4) moves through the arc of a circle instead of reciprocating in a straight line, the closer $z$ being on one end of the lever $q$, fulcrumed between the center of the lever and the muff of the governor. The coherer is tapped by the lever $l'$, vibrated by a tappet $j'$ on the spindle $j''$, rotated from the spindle $j$ by the wheels $x$, of which there are shown two pairs, giving different speeds, by sliding the wheels on the parallel shaft so that one or other of them gears with one of the wheels on the shaft $j$, as in other well-known change-gear devices.

Figure 6:
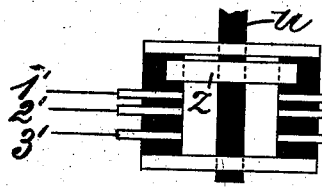
Figure 7:
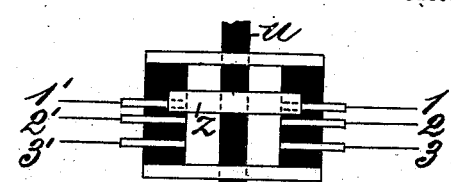
Figure 8:
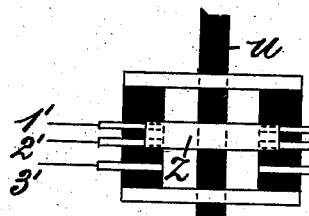
Figure 9:
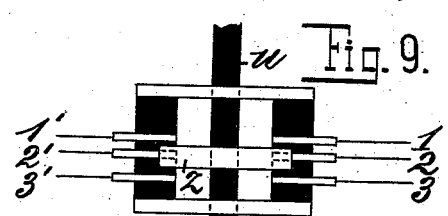
Figure 10:
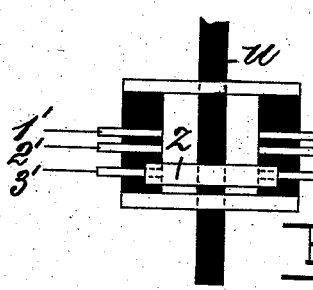

Referring now to Figs. 6 to 11, inclusive, it will be seen that in Fig. 6 the circuits 1, 2, and 3 are arranged and the circuit-closer is in the position indicated by Fig. 1. Assuming, again, that the receptor is a twin-screw torpedo, with the position illustrated by Fig. 6 the torpedo is at rest, no transmission taking place. In Fig. 7 transmission is taking place at the lowest speed, the governor is rotated at its lowest speed also, and the port-motor circuit 1 is momentarily closed. The rate of transmission on being instantly increased to the second speed, the increased speed of the governor brings the circuit-closer over the terminals of both the circuits 1 and 2, Fig. 8. Consequently both the screw-motor circuits being closed the torpedo travels a straight course. If now the speed be diminished or increased, either the starboard or the port motor will be cut out, the other remaining in work, and the course of the torpedo will diverge accordingly. The rates of speed for the circuits 1 and 2 are much less than for the circuit 3, which includes the exploder or fuse. In the diagrams, Fig. 6 shows a state of rest; Fig. 7, the port motor working only; Fig. 8, port and starboard motors both working; Fig. 9, starboard motor only at work, and Fig. 10 both motors stopped and exploder-circuit closed. In the diagram Fig. 11 a differing arrangement of the local circuits in the receptor is shown. Here an independent motor M is shown to drive the propeller from a battery $4^a$. 1 is part of a circuit including the starboard servomotor, 2 part of a circuit including the port servomotor, and 3 part of the exploder or fuse circuit. On one side of the reciprocating bar $u$ each of these circuits has a terminal-plate, the other terminal on the opposite side having the common terminal plate 5. The circuit 4 is connected with the two broad terminal plates 6 6, and the bar $u$ carries two circuit-closing bridge-pieces $z\ z'$. By inspection of the diagram it will be seen that from the moment of starting the apparatus by the commencement of transmission the driving-circuit 4 will continue to be closed by the bridge-piece $z'$, whatever circuit may be closed by the bridge-piece $z$. With the illustrated arrangement of the circuits one end of the bridge-piece $z$ will be upon the insulation 7, between the contacts for circuits 1 and 2, for a straight course, so that neither of the local circuits 1, 2, or 3 is closed when second rate of transmission, reckoning from the lowest, is in operation. If the rate of transmission be reduced to the first or lowest, the starboard servomotor 1 will be closed, or if the third rate of transmission be used the port-servomotor circuit 2 will be closed only. With the highest rate of transmission in use the exploder or fuse circuit 3 will be closed. Hence the control of the several local circuits is effected in substantially the same manner as already described with reference to Figs. 6 to 10, inclusive. I have experimentally found that so long as the receptor can be observed by the operator there is no difficulty whatever for an expert operator in accurately controlling the receptor.

Figure 14:
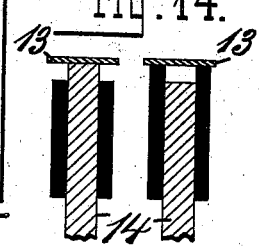

The rate of transmission when the periods of contact in the transmitter are to be unequal and their times equal may be controlled by the device represented by Figs. 12, 13, and 14. The crank 10 is rotated by clockwork or other uniformly-moving mechanism and is connected by the rod 11 with the duplex rocking arm 12, capable of being oscillated on the spindle 12$^a$ by the crank. On the same spindle there is centered the segment 14, one half of the periphery of which is a conductor and the other half a non-conductor of electricity. Above and in contact with the periphery of the segment there is carried by the duplex arm a spring contact-maker 13. When the segment is adjusted in the vertical position shown by Fig. 13 and fixed in that position, the spring 13 in its to-and-fro movement will not reach the conducting portion of the quadrant. Consequently there will be no transmission. If the segment be moved and fixed to the left, the duration of the periods of contact will increase. The strokes being equal in time and the periods differing, the desired range in the rates of transmission may be obtained by fixing the segment in the correct position, which may be easily done by a hand 15, fixed upon shaft 12$^a$ and moving in front of a graduated quadrant 16. By an obvious modification the segment 14 may be a fixture and the crank by the intercalation of change-wheels may be made to rotate more quickly or slowly. This modification gives equal closures and different times, and the result is the same. In Figs. 12 and 13 no parts of the transmitting-circuit are shown; but it will be understood that one pole is connected with the spring 13 and the other pole with the conducting portion of the periphery of the segment. Cross-sections of the periphery of the segment are shown in Fig. 14, where the spring 13 is represented as being in the conductive and non-conductive positions, respectively.

What I claim, and desire to secure by Letters Patent, is—

1. In apparatus for controlling diverse actions at a distance, a device for transmitting etheric undulations at a variable rate from the control-station, a receiving-circuit in the receptor including a coherer, a battery and a relay, a decoherer, a motor, a motor-control circuit opened and closed by the relay, a centrifugal governor driven by the motor, diverse local circuits having contiguous terminals, and a circuit-closer operated by the centrifugal governor and adapted to open and close the local circuits separately or in plurality, substantially as set forth.

2. In apparatus for controlling diverse actions at a distance, a device for transmitting etheric undulations at a variable rate from the control-station, a receiving-circuit in the receptor including a coherer a battery and a relay, a motor, a motor-control circuit opened and closed by the relay, a centrifugal governor driven by the motor, diverse local circuits having contiguous terminals, and a circuit-closer operated by the governor to open and close the local circuits separately or in plurality, substantially as set forth.

3. In a receptor in which diverse actions are controlled from a distance by etheric undulations, a receiving-circuit including a coherer a battery and a relay, a decoherer, a motor, a motor-control circuit opened and closed by the relay, a centrifugal governor driven by the motor, diverse local circuits having contiguous terminals, and a circuit-closer operated by the centrifugal governor and adapted to open and close the local circuits separately or in plurality, substantially as set forth.

4. In a receptor in which diverse actions are controlled from a distance by etheric undulations, a receiving-circuit including a coherer a battery and a relay, a motor, a motor-control circuit opened and closed by the relay, a centrifugal governor driven by the motor, diverse local circuits having contiguous terminals, and a circuit-closer adapted to open and close the local circuits separately or in plurality, substantially as set forth.

5. In a receptor in which diverse actions are controlled from a distance by etheric undulations, a motor, a motor-control circuit a receiving-circuit, a relay in said receiving-circuit arranged to open and close the motor-control circuit, a centrifugal governor driven by the motor, diverse local circuits having contiguous terminals, and a circuit-closer adapted to open and close the local circuits separately or in plurality, substantially as set forth.

6. In a receptor in which diverse actions are controlled from a distance by etheric undulations, a motor, a motor-control circuit a receiving-circuit, a relay in said receiving-circuit arranged to open and close the motor-control circuit, a centrifugal governor driven by the motor, and a sliding part connected with the governor and adapted to open and close diverse local circuits, substantially as set forth.

7. In a receptor in which diverse actions are controlled from a distance by etheric undulations, a centrifugal governor, a ratchet-wheel and pawl for driving the same, an electromagnet having a movable armature, an arm attached to said armature and carrying said pawl, a magnet-circuit opened and closed by said arm, a battery in the magnet-circuit, a receiving-circuit and a relay in the receiving-circuit operating to additionally open and close the magnet-circuit, substantially as set forth.

8. In a transmitter by means of which diverse actions are controlled at a distance by etheric undulations, means for periodically producing the undulations so that there may be in different units of time, different sums of the periods of transmission, the said means comprising a segment having part of its periphery conductive and part non-conductive, a contact-spring capable of being moved upon the periphery of the segment, and a rotated crank reciprocating the spring through a connecting-rod, substantially as described.

In testimony whereof I have signed my name in the presence of two subscribing witnesses.

JOHN GARDNER.

Witnesses:
THOMAS WOODS,
JOHN JACKSON.